May 3, 1966 A. STANFORD 3,249,341
LIQUID CIRCULATORS
Filed Dec. 2, 1963 3 Sheets-Sheet 1
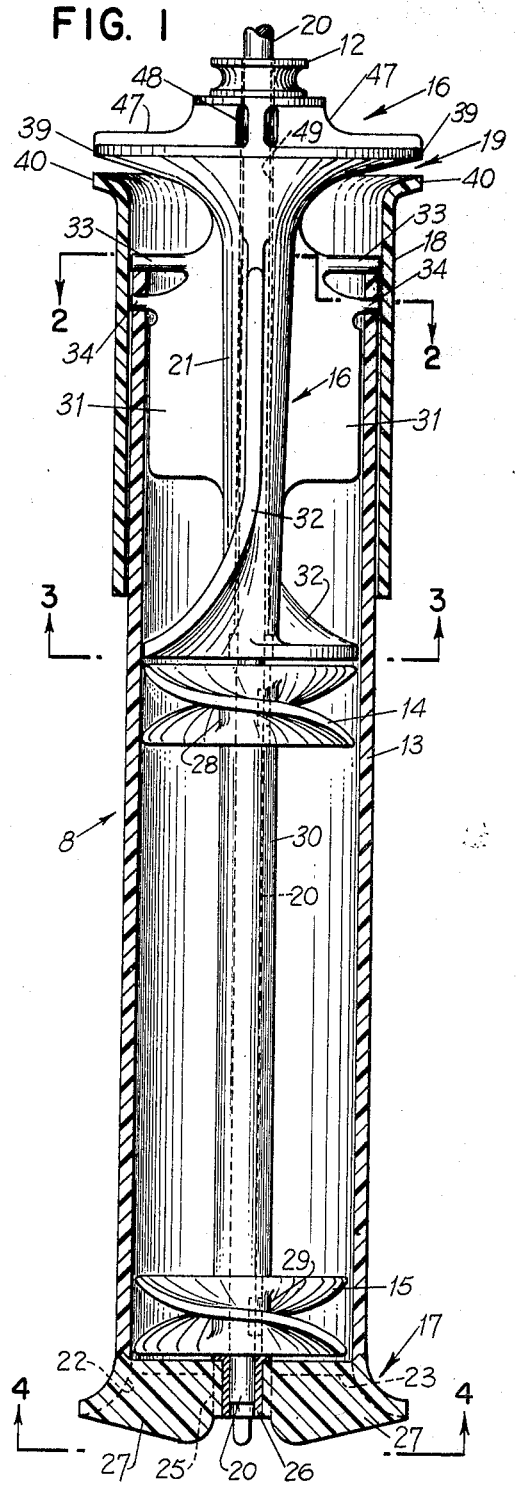
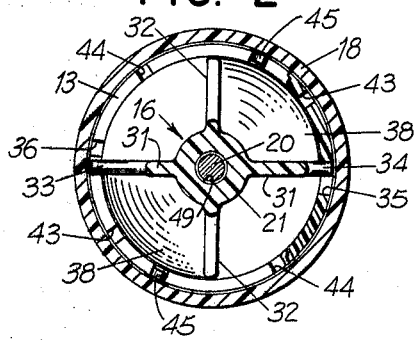
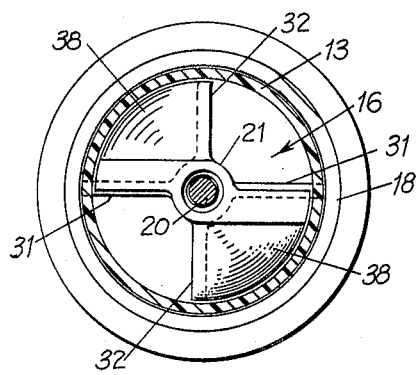
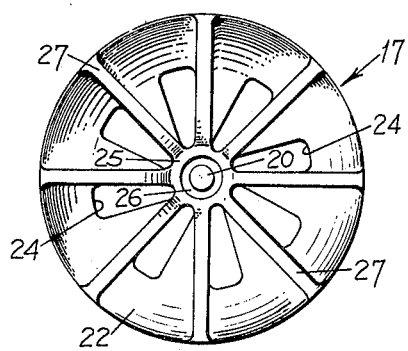
INVENTOR
ARTHUR STANFORD
BY
ATTORNEY May 3, 1966 A. STANFORD 3,249,341
LIQUID CIRCULATORS Filed Dec. 2, 1963 3 Sheets-Sheet 2

INVENTOR
ARTHUR STANFORD
BY
ATTORNEY

May 3, 1966  A. STANFORD  3,249,341
LIQUID CIRCULATORS

Filed Dec. 2, 1963  3 Sheets-Sheet 3

INVENTOR
ARTHUR STANFORD
BY
ATTORNEY

United States Patent Office 3,249,341
Patented May 3, 1966

3,249,341
LIQUID CIRCULATORS
Arthur Stanford, Chicago, Ill., assignor to American Machine & Foundry Company, a corporation of New Jersey
Filed Dec. 2, 1963, Ser. No. 327,443
14 Claims. (Cl. 259—97)

The present invention relates to liquid circulators especially for use in dispensers and aims to provide new and useful improvements in a pumping unit for such dispensers.

The circulator is adapted for use in a dispenser dispensing liquids of any type and form for example, fruit juices and drinks, coffee or other types of beverages, as well as medical, therapeutic and diagnostic beverages, such as barium meal and chemical solutions such as X-ray developing fluids.

For illustration only, the circulator will be described for use in connection with a refrigerated dispenser for fruit juices of the display type mounted on counters. It is to be understood that the invention may, however, be incorporated in any kind of dispenser of whatever capacity, whether heated or refrigerated, and no matter what type or form of liquid or beverage is dispensed.

A typical refrigerated beverage dispenser includes a base housing a mechanical refrigeration system and surmounted by a flat cold plate. The beverage container, or reservoir, typically an inverted cylindrical or rectangular vessel, rests on the cold plate so that contained liquid is in contact therewith. The circulator is a unit extending vertically within the reservoir centrally thereof, and is continuously driven, e.g., by a motor mounted on top of the container, to constantly circulate a beverage, such as fruit juice. This not only uniformly cools the beverage as it flows along the cold plate in the path of circulation, but also serves to constantly agitate the beverage. Agitation has a number of advantages: it prevents stagnation of liquid in the reservoir, assists in the uniform cooling of the liquid being circulated, enhances the appearance of the beverage, and preserves its potability; moreover, agitation maintains a uniform suspension of pulp and sediment, e.g., in a fruit juice, and thus mitigates against the separation and drying out of the components of the juice, to preclude such dried out components from clinging to various parts of the dispenser with consequent stagnation and unsightliness.

The liquid reservoir is usually transparent, and the pump, or circulator, is adapted to draw liquid from the bottom of the reservoir and discharge it against the underside of the top of the reservoir, whence due to capillary action and imparted velocity it flows to and washes down the wall of the reservoir, thus preventing particles from sticking to the reservoir wall, giving the appearance of fullness of the reservoir, and creating an attractive fountain effect. A typical circulator of the foregoing type is shown and described in U.S. Patent 3,106,383 issued October 8, 1963, to Virgil John Philipps, entitled "Liquid Circulators."

Problems met with in known types of circulating pumps employed in beverage dispensers include, amongst others, objectionable foaming and breakdown, i.e., destructive agitation, of circulating fruit juices, clogging of pump parts by components of pulpy juices, difficulty of cleaning and maintaining the circulator units in proper operating condition, lack of provision for easy manual adjustment of the circulator to accommodate the viscosity and pulp content of any particular juice, and difficulty in assembling or dismantling the apparatus for cleaning, inspection and repair or replacement of parts.

Accordingly, the aim of the invention is to provide a liquid circulator for a beverage dispenser which is free of the aforementioned difficulties.

One object of the invention is to provide a liquid circulator which can handle both pure and pulpy juices without foaming, juice breakdown or clogging.

Another object of the invention is to provide a liquid circulator which can be easily adjusted to suit the viscosity and pulpiness of a beverage.

A further object of the invention is to provide a circulator which maintains a substantially uniform rate of flow irrespective of variations in the level of liquid being circulated.

Yet other objects are to provide a liquid circulator which is capable of long trouble-free operation, which is easily installed, maintained and replaced, and which does not call for particular skill in operating, or adjusting same.

With the foregoing and other objects in view, there is provided in a beverage dispenser of the type having a liquid storage reservoir as described, a circulator in the form of a vertical cylindrical assembly centrally positioned within the said reservoir and adapted to be suspended from the bracket of a drive motor mounted atop the reservoir. The circulator assembly includes a cylindrical housing for a pair of impellers, one at the lower, the other at an intermediate portion of the housing, mounted on a common shaft extending centrally of the assembly and adapted to be coupled to the shaft of the drive motor. The impellers are designed for minimum cavitation or agitation and maximum lift.

Juice is drawn through the bottom of the impeller housing through a set of vertical vanes to reduce whirlpooling as the juice flows to the lower impeller.

Above the upper impeller there is mounted a stationary deflector head which intercepts the liquid leaving the upper impeller and diverts it into upward flow. This is accomplished either by a helical vane around a central hub, in the nature of a stationary archimedean screw, or by a plurality of vertical vanes on a central hub, at the lower portions of some of the vanes being provided with constant rise 90° leads. Whichever the form of vane construction, the helix or head, as the case may be, is of opposite hand to the impellers and designed to carry liquid away smoothly from the upper impeller. The hub diameter increases from bottom to top to increase the velocity of the liquid and to compress it to reduce foam.

The upper portion of the hub of the deflector is smoothly flared outward and terminates in an annular shoulder which is adapted to deflect liquid against the top of the reservoir, to be conveyed by capillary action and imparted velocity to the walls of the reservoir where the liquid flows down in a washing effect. A cylindrical sleeve, or collar, is adjustably telescoped over the upper part of the impeller housing in the vicinity of the deflector head, and the upper surface of the sleeve defines with the shoulder of the deflector head a horizontal annular discharge port or gap, the vertical adjustability of the sleeve regulating the size of the gap.

The impeller shaft passes through the hub of the deflector head, and the latter has provision for suspending the circulator assembly from a motor bracket, for example, atop the reservoir.

The objects and advantages of the invention, as well as the specific features of construction, arrangement, and combination of the parts thereof will appear fully from the following detailed description of two preferred embodiments, in connection with the accompanying drawings, in which:

FIG. 1 is an elevation, partly in section to show interior parts, one embodiment of a circulator constructed according to the present invention;

FIGS. 2 and 3, respectively, are horizontal sections taken on lines 2—2 and 3—3 of FIG. 1;

FIG. 4 is a view, taken on the line 4—4 of FIG. 1, of the bottom, or inlet, of the circulator assembly;

Figure 5:
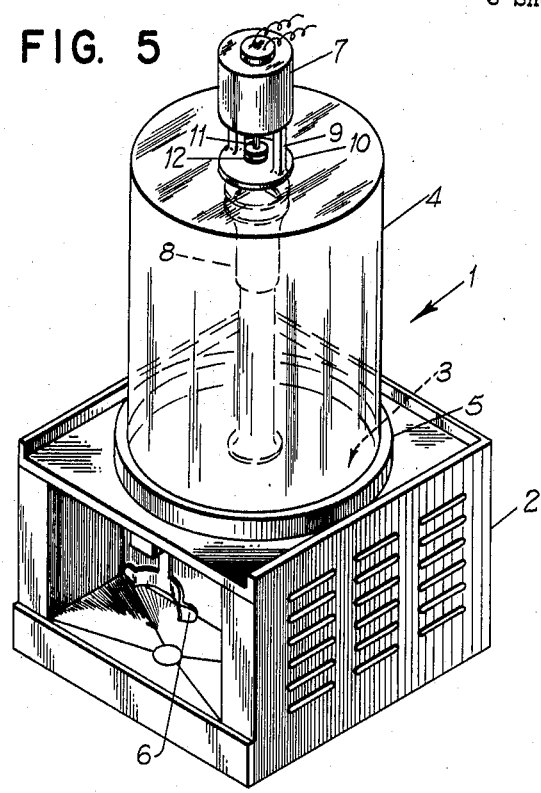
FIG. 5 is a perspective view of a typical beverage dispenser embodying the liquid circulator, or pump, of this invention.

Referring to FIG. 5, there is shown a refrigerated type of beverage dispenser 1 comprising a base 2 housing a mechanical refrigeration unit (not shown). Such units are well known in the art and need no further description. The top of the base includes the well known cold plate 3, here circular in form, for cooling a liquid in heat exchange relationship therewith. A liquid, such as a fruit juice, is stored in a display reservoir 4 made of glass or other transparent material. As shown, the reservoir is an inverted cylindrical vessel, i.e., the closed end is topmost and the open end of the vessel rests of the periphery of the cold plate 3, within an annular resilient flange 5 extending up from the periphery of the cold plate and forming an effective seal with the bottom edge of the reservoir. Beverage may be withdrawn from the reservoir through a conventional spring-loaded spigot 6. The reservoir 4 may be filled through a suitable opening provided with a venter cover (not shown) in the top surface of the reservoir, or through a cylindrical opening above which is mounted a motor 7 from which depends into the reservoir, the liquid circulator 8 (in phantom lines), this opening (not shown) being exposed by manually lifting the motor 7 and thereby withdrawing the circulator 8 out of such opening.

The motor 7 is mounted on a bracket 9 provided with a circular base 10 of larger diameter than the central opening in the top of the reservoir 4. The shaft of the motor 7 may be coupled to the shaft of the circulator 8 by means of a spring clutch (not shown) at 11, in a manner similar to that described in the aforesaid patent to Virgil John Philipps, U.S. 3,106,383. The grooved circular element 12 is coupled to the top of the circulator and a slotted plate (not shown) may be slipped between the grooved element 11 and the motor base 10 to prevent the circulator assembly from dropping off the end of the motor shaft, the slotted plate being secured by a spring clip (not shown), all as described in detail in the patent to Philipps, U.S. 3,106,383. These as well as other conventional features of the dispenser not elaborated herein are not described in detail because they form no part of the present invention, which is the improved liquid circulator 8 now to be described.

The preferred embodiment of the liquid circulator, or pump 8, is shown in FIGS. 1–4, 6 and 7, and is seen as generally comprising a vertical cylindrical tube 13 housing a central shaft 20 mounting a pair of impellers 14, 15 in the lower portion of the housing, and passing through the hub 21 of a deflector head 16 in the upper portion. The lower end of the pump housing 13 is provided with a vaned beverage inlet 17, whereas the upper end of the housing 13 is provided with a telescoped sleeve, or control collar, 18. The upper end of the collar and the adjacent portion of the deflector head 16 define therebetween an adjustable beverage discharge gap 19. When coupled to the motor 7, as shown in FIG. 5, and mounted within the reservoir, the pump assembly 8 is centrally disposed of the reservoir, with its bottom or inlet 17 in proximity to, or resting lightly upon, the cold plate 3, and with its discharge gap 19 in proximity to the inner surface of the top of the reservoir 4. With this arrangement, a beverage circulated upwardly through the pump is discharged against the bottom surface of the top of the reservoir 4, and through imparted velocity and capillary action is carried to the wall of the reservoir and flows down the wall, imparting a washing action and preventing syrup or pulp from sticking to the wall, spoiling, and becoming unsightly. This also reduces the degree of aeration the liquid is subjected to and minimizes foaming.

Returning to FIGS. 1–4, 6 and 7, the beverage inlet 17, at the bottom end of the pump housing 13, is defined by an annular wall 22, the upper end of which is suitably bonded to the bottom of the wall of the impeller housing 13. The inlet wall 22 is smoothly curved downwardly and outwardly to define a smooth flow path for a beverage. Across the narrow portion of the inlet, there is provided a horizontal platelike portion 23 having a plurality of slots 24 collectively defining a restricted flow opening. The platelike portion 23 is provided with a central depending hub 25 fitted with a bushing 26 which receives the bottom end portion of the impeller shaft 20. Extending between the hub 25 and the wall 22 are a plurality of integral vertical vanes 27. Beverage drawn through the inlet is kept moving vertically by the vanes 27 to prevent whirlpooling and destructive agitation of the liquid and to restrict or control the amount of liquid passing into the pump. The slotted flow openings 24 cooperate with the vanes 27 in those respects.

The inlet area should be restricted to considerably less than pump capacity to cancel out the effect of varying head pressure at the inlet due to changes of liquid level in the beverage reservoir as drinks are dispensed or the reservoir is replenished. The restricted inlet area thus helps to maintain a constant pump speed and correspondingly uniform flow of liquid through the pump.

Liquid passing through the pump inlet 17 is lifted through the pump by the set of two impellers 14 and 15, which are designed for minimum cavitation and maximum lift. Each impeller is two-bladed, of constant and uniform rise (pitch) construction, and of a diameter slightly less than that of the interior of housing 13. The leading edge of each blade is provided with a full smooth radius to allow pulp and solid matter to slide past and prevent a build-up of solids and other obstructions on the leading edges that would tend to distribute the smooth flow of liquids through the impellers.

The two impellers 14 and 15 are suitably keyed to pump shaft 20. The bottom hub face of lower impeller 15 rotatingly abuts a peripheral lateral extension of bushing 26 overlying the upper end of inlet hub 25. The upper impeller 14 is disposed in an intermediate portion of the housing 13 and the two impellers have clamped between their hubs 28 and 29 a sleeve 30 surrounding shaft 20. The sleeve 30 is optimally the diameter of the impeller hubs to prevent cavitation (if the sleeve is of lesser diameter) and to prevent unnecessary restriction (if the sleeve is of larger diameter).

As the liquid leaves the upper impeller 14, in a rotary or swirling motion, it passes through the deflector head 16 which is designed to intercept the liquid and to divert it into a substantially upward flow with a minimum degree of agitation.

The deflector head is mounted in the supper portion of the pump housing 13, immediately above impeller 14, and is provided with a hub 21 bored to receive the impeller shaft 20 therethrough. Extending radially from the deflector hub 21 at an intermediate portion thereof are two pairs of vanes 31, 31 and 32, 32, the vanes 31, 31 lying in a common plane transverse to the common plane of vanes 32, 32. Each vane 32 is provided with a constant rise 90° spiral lead 38 extending from a point immediately above impeller 14 and being opposite hand thereto in order to receive liquid from the impeller in the same direction it leaves the latter to minimize turbulence. Moreover, the deflector hub 21 is slightly flared upwardly to increase the velocity of liquid and to compress it to minimize the possibility of foaming.

Resilient catch means are provided to permit quick and simple insertion and removal of the deflector head. Each of the vanes 31 is provided at its upper portion with a pair of integral, horizontal, outwardly extending, vertically spaced rod-like projections 33 and 34. The top edge of the pump housing 13 is provided with a pair of diametrically opposed L-shaped slots. The clear vertical distance between each rod 33 and each rod 34 is such that each pair of rods 33 and 34 may be inserted downwardly into their associated slots 35 and 36 and then by a slight twist of the deflector head the lower rod 34 slips into the horizontal leg of its associated L-slot while the upper rod 33 is snapped or sprung over the upper edge of the vertical leg of the slot into a slight indent 37. This provides an effective yet simple means for securing the agitator head in position within the pump housing. Obviously the deflector head is easily removed by reversing the operation just described.

As the liquid leaves the guiding effect of the four vanes, 31, 31, 32, 32 of the deflector head 16, the direction of flow is diverted so as to impinge against the underside of the top of the reservoir through a 360° arc, to flow, as previously described, towards and down the walls of the reservoir, thus recombining with the body of liquid stored in the reservoir. In one apparatus constructed according to this embodiment of the invention, a 15° angle of incidence of the flow with respect to the top of the bowl was found to be best, although about 5° variation was permissible without adversely affecting the flow of liquid along the inner surfaces of the reservoir. The required delivery of liquid through a horizontally annular orifice, or discharge gap, 19 is provided for by the particular configuration of the upper portion of the deflector head hub 21 and its associated flow control collar 18.

The upper portion of deflector head hub 21, i.e., the portion above the guide vanes 31 and 32, is smoothly flared upwardly and outwardly to define a concave surface of revolution whose tangent at the circular periphery, or shoulder, 39 is at an angle to the top of the reservoir corresponding to the desired angle of incidence of the discharged liquid with respect to the top surface of the reservoir. The collar 18 associated with the liquid discharge gap 19 is a cylindrical tube sleeved over the upper portion of the pump housing 13 and vertically adjustable thereon. The upper end of the collar 18 is smoothly upset to define a surface of revolution whose tangent at the circular periphery 40 is parallel to that of the complementary peripheral edge 39 of the deflector head. These spaced circular edges 39 and 40 define the liquid discharge gap.

Figure 6:
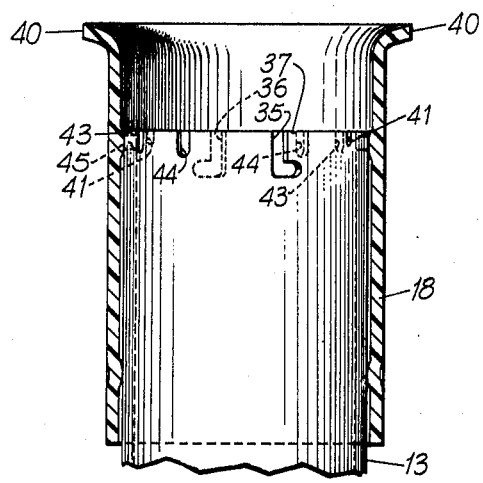
FIGS. 6 and 7 are vertical sections through the gap adjustment sleeve associated with the deflector head.
Figure 7:
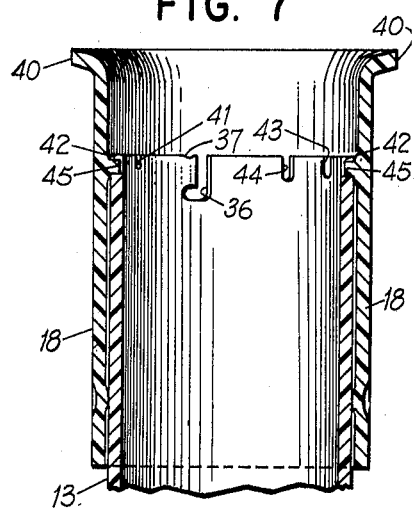

The width of the discharge gap is adjustable, in this embodiment for four settings, although any desired number of settings may be provided for. The gap adjustment is effected by adjusting the control collar 18 vertically. Referring especially to FIGS. 2, 6 and 7, the upper edge of the pump housing 13 is provided with four diametrical pairs of stepped vertical slots, i.e., of varied depth, these being pairs 41, 42, 43 and 44. A pair of diametrically opposed detents 45 on the inner surface of control collar 18 can be accommodated in any of the four pairs of slots in the upper edge of the pump housing 13 to set the collar 18 for any desired opening of liquid discharge gap 19; for example, the slot openings in one apparatus constructed according to the invention varied from .020″ to .140″ in depth. The largest opening or gap is used for beverages with heavy pulp content to allow pulp and solids to pass through and minimize clogging; the smallest gap is intended for heavy foaming beverages; and the intermediate gaps are for other beverages of different viscosities and pulp content so the pump discharge can be adjusted to suit the majority of applications.

The inside diameter of the control collar 18 is slightly larger than the outside diameter of the pump housing 13 so that the control collar is sleeved loosely around the pump housing to allow a slight bypass or leakage of liquid down the outside surface of the pump housing 13 to prevent pulp and solids from adhering to the surface and spoiling. Referring to FIG. 1, the top of the deflector head is provided with stiffening ribs 47, and drain holes 48 in their vicinity communicate with the bore 49 of the deflector head so that any liquid which is forced up through the bore in the annular space between said bore and the impeller shaft 20 may drain back into the reservoir, in this case into the liquid sprayed from the gap 19. This precludes liquid from working up the impeller shaft 20 toward the motor shaft. The cylindrical grooved element 12, an integral part of the deflector head, is utilized in mounting the pump assembly from the top of the reservoir as explained above in the description of FIG. 5.

Figure 8:
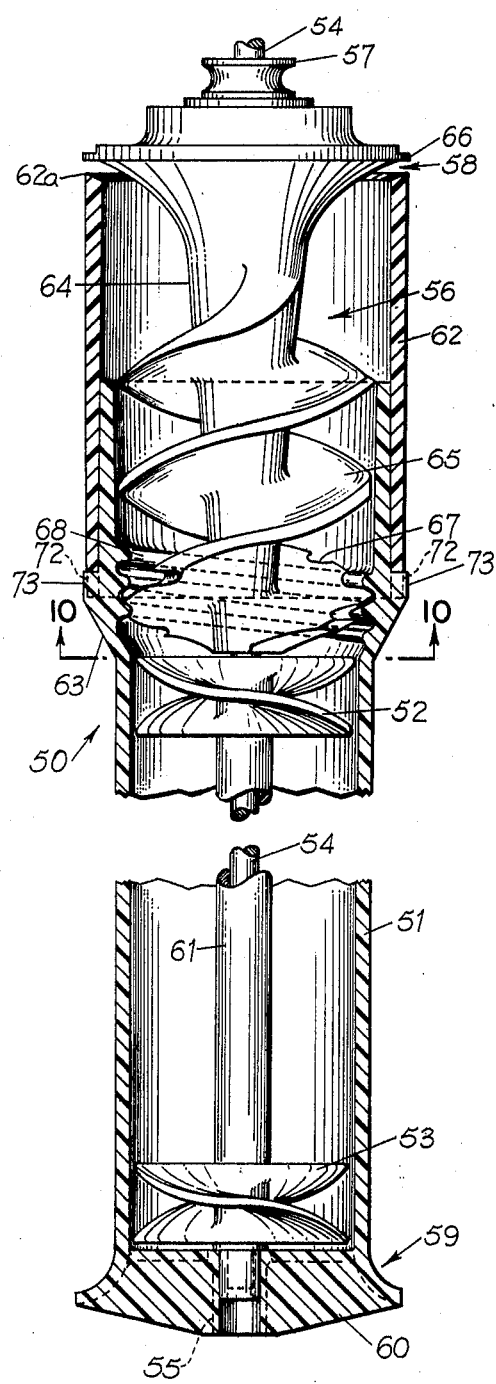
FIG. 8 is a fragmentary elevation, partly in section, of a circulator embodying a modified deflector head and gap control sleeve.
Figure 9:
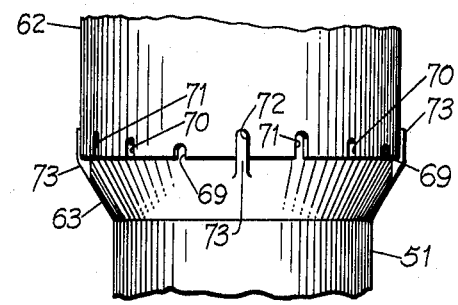
FIG. 9 is a fragmentary detail of the mounting of the control sleeve on the impeller housing.
Figure 10:
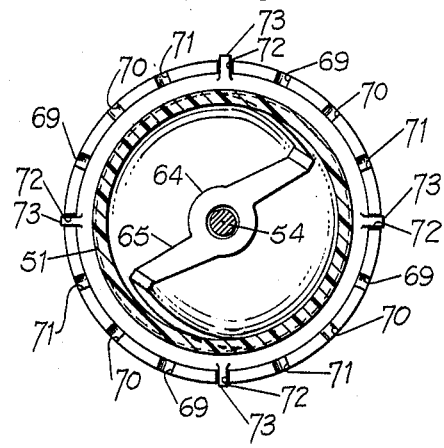
FIG. 10 is a horizontal section taken on the line 10—10 of FIG. 8.

A modified form of the invention is embodied in FIGS. 8–10. Here the circulator assembly 50 includes the pump housing 51 and contained impellers 52 and 53 mounted on a shaft 54 extending from the bored hub 55 of pump inlet 59 upwardly through the pump housing 51, then through the deflector head 56 and finally through the pump mounting element 57 atop the deflector head. A vertically adjustable flow control collar 62 cooperates with the deflector head 56 to define the beverage discharge gap 58.

The pump inlet 59 is only slightly modified structurally from the corresponding part in the previous embodiment of the invention, in that the guide vanes 60 are not rounded off at their junction with the inlet hub. Aside from this difference in detail, the inlet 59 functions as its counterpart in the previous embodiment of the invention.

The impellers 52 and 53 and the sleeve 61 clamped therebetween are constructed and arranged to function identically wtih their counterparts in the first embodiment of the invention.

The upper part of the pump housing 51, the deflector, or spray, head 56 and the gap control collar 62 are the essentially modified features of this embodiment of the invention.

An upper portion of the pump housing 51 is provided with a thickened wall section 63, and extending from this wall section 63 to the top of the housing, the diameter of the housing is slightly larger than the lower portion of the housing, but the wall is of the same thickness. The interior of the thickened wall section 63 is provided with several round type threads 68 for a purpose to be described.

The deflector head 56 is provided with an upwardly flaring hub 64 for the same purpose as in the previous embodiment. Around this hub is an integral helical guide vane 65, defining a stationary spiral path for liquid, like a stationary Archimedean screw. As in the case of the deflector of the previous embodiment, this deflector 56 is designed to intercept liquid as it leaves impeller 52 in a rotary motion and divert it vertically with a minimum of agitation. The helical vane 65 is opposite hand to the impeller 52 and is designed to minimize agitation by carrying away liquid at the same angle the liquid leaves the face of impeller 52. The upper portion of the deflector hub 56 terminates in a concave surface of revolution whose circular periphery, or shoulder, 66 cooperates with the top edge 62a of the gap control collar 62 to define the 360° liquid discharge gap 58. The means for mounting the deflector within the pump housing is in the nature of several round type thread segments 67 in the edges of the lowermost portion of the spiral vane 65, these threads 62a matching the threads 68 of the wall section 63 of the pump housing. Thus the deflector head may be easily threaded into and out of the pump housing.

The bottom end of the gap control collar 62 is provided with a plurality of pairs of diametrically opposed vertical notches 69, 70, 71 and 72, being graduated, or stepped, in height. Complementary lugs 73 on the pump housing wall section 63 are selectively engageable with the notches 69–72 to adjust the liquid discharge gap 58 between the circular shoulder 66 of deflector head 56 and the top edge 62a of control collar 62, the top edge 62a being beveled to direct the liquid discharge upward at a slight angle to the horizontal against the top of the reservoir as and for the purposes set forth in the previous embodiment of the invention.

There has thus been described an improved liquid circulator, especially for use in beverage dispensers, which is constructed and adapted to achieve the aims and objects of the invention. The pump or circulator consists of four parts: deflector head, impeller shaft, pump housing, and liquid discharge gap adjustment collar. The units can be completely assembled or disassembled without the aid of any tools, and the liquid discharge gap of the pump can be adjusted manually to suit the viscosity and pulp content of the beverage being displayed.

The herein described embodiments being illustrative only, equivalent modifications of the features of construction, arrangement and combination of the parts of the apparatus will be readily apparent to those skilled in the art, and the invention is to be construed as covering all such modifications that fall within the scope of the appended claims.

I claim:

1. In a beverage dispenser or the like having a liquid reservoir, a liquid circulator comprising a cylindrical housing mounted substantially vertically within the reservoir, the bottom of the housing having a liquid inlet, the top of the housing being open and defining a liquid outlet, motor driven impeller means within the housing for lifting liquid through the housing and thereby circulating the liquid in the reservoir, stationary liquid guide means mounted above the impeller means in the housing and adapted to guide swirling liquid leaving said impeller means along an upward flow path, the guide means including an axial hub and at least one upwardly directed guide vane extending from said hub, the top portion of said hub being a smoothly flared concave surface of revolution terminating in a circular shoulder coextensive with and spaced above the top of the housing, the top of the housing wall and the shoulder defining therebetween an annular liquid discharge gap through which liquid is forced laterally outward in the form of an annular sheet, the housing comprising an upper sleeve telescoped over a lower cylindrical wall, and means for selectively adjusting the sleeve vertically on the cylindrical wall, whereby the height of the liquid discharge gap between the hub shoulder and the top of the sleeve may be varied.

2. The combination according to claim 1 in which the shoulder and the top of the sleeve are sloped slightly upwardly whereby the liquid discharged from the gap is directed against the bottom surface of the top of the reservoir.

3. The combination according to claim 1, in which the guide vane on the hub is a helical vane to smothly guide liquid in a spiral upward path.

4. The combination according to claim 1 including a plurality of guide vanes extending radially from the hub in vertical planes, some of said vanes having a depending lower portion with a slight lead to smoothly guide swirling liquid upward between the vanes.

5. In a beverage dispenser or the like, having a liquid reservoir, a liquid circulator comprising a cylindrical housing disposed substantially vertically within the reservoir, the top of the housing being open and defining a liquid outlet, the bottom of the housing having a liquid inlet, a rotatable shaft extending axially of the housing, protruding above the top of the housing, and being adapted to be coupled at its upper end portion to motor drive means, liquid impeller means fixed to the shaft within the housing for lifting liquid through the housing whereby to circulate the liquid within the reservoir, a stationary liquid guide member mounted in said housing above said impeller means for guiding swirling liquid from said impellers into an upward flow path, the guide member comprising an elongated vertical hub mounted axially of the housing, and at least one guide vane extending integrally from the hub, the hub being bored to receive the drive shaft therethrough, the upper portion of said hub being arcuately flared in the form of a concave surface of revolution terminating in a circular shoulder portion coextensive with and spaced above the top of the housing, the shoulder and the housing wall defining an annular flow gap whereby liquid is discharged therethrough laterally in the form of annular sheet, the housing being comprised of an upper and a lower member, the upper member being adjustably and removably telescoped over the lower member to selectively vary the depth of the annular discharge gap, the guide member being removably mounted on the lower housing member.

6. The combination according to claim 5 in which the guide hub is uniformly increased in diameter up to the flared hub portion, whereby to compress the liquid and reduce foaming.

7. The combination according to claim 6 in which the guide includes a plurality of vanes extending from the hub in radial vertical planes, some of said vanes each being provided with a depending spiral lead.

8. The combination according to claim 6 in which the guide vane is a helical vane around the hub defining an upward spiral flow path.

9. The combination according to claim 7 in which the impeller means includes an upper and a lower impeller, the upper impeller being mounted adjacent the lower end of the guide hub, the lower impeller being mounted adjacent the housing inlet, a sleeve surrounding the shaft and of a diameter that of the impeller hubs, the sleeve being clamped between the impeller hubs, the impellers being slightly less in diameter than the interior diameter of the housing, the impellers being opposite hand to lead of the vane.

10. The combination according to claim 8, in which the impeller means includes an upper and a lower impeller, the upper impeller being mounted adjacent the lower end of the guide hub, the lower impeller being mounted adjacent the housing inlet, a sleeve surrounding the shaft and of a diameter that of the impeller hubs, the sleeve being clamped between the impeller hubs, the impellers being slightly less in diameter than the interior diameter of the housing, the impellers being opposite hand to lead of the vane.

11. The combination according to claim 9, in which the housing inlet is provided with a plurality of flow openings in a plate transverse of the inlet, the flow openings being so dimensioned that the total area thereof is effective to restrict the flow of liquid to a fraction of the pump capacity to obviate the effect of fluctuation of static head in the reservoir, and radial vanes are mounted in vertical planes within the inlet between flow openings to prevent swirling of liquid flowing to the lower impeller.

12. The combination according to claim 10, in which the housing inlet is provided with a plurality of flow openings in a plate transverse of the inlet, the flow openings being so dimensioned that the total area thereof is effective to restrict the flow of liquid to a fraction of the circulator capacity to obviate the effect of fluctuation of static head of the reservoir, and radial vanes are mounted in vertical planes within the inlet between flow openings to prevent swirling of liquid flowing to the lower impeller.

13. In a liquid dispenser, or the like, having a liquid reservoir, a circulator comprising a cylindrical housing mounted substantially vertically within the reservoir, the bottom and the top of the housing respectively defining a liquid inlet and a liquid outlet, a rotatable shaft extending axially of said housing, protruding beyond the housing, and being adapted to be coupled to motor means, continuously rotatable impeller means fixed to the shaft within the housing for lifting liquid through the housing thereby to circulate the liquid in the reservoir, liquid guide means mounted above the impeller means in the housing, the guide means being stationary and provided with a hub to receive the shaft therethrough, the guide means including integral guide vanes extending from the hub for guiding swirling liquid leaving the impeller means along an upward path in the upper portion of the housing, the uppermost portion of the hub being flared as a concave surface of revolution terminating in an annular shoulder substantially coextensive with and spaced above the top of the housing, the shoulder and the top of the housing defining therebetween an annular flow gap through which liquid is forced out laterally of the housing in the form of an annular sheet, and means for adjusting the height of the annular liquid discharge gap.

14. In a liquid dispenser, or the like having a liquid reservoir, a circulator comprising a cylindrical housing mounted substantially vertically within the reservoir, the bottom and the top of the housing respectively defining a liquid inlet and a liquid outlet, the inlet being a smoothly curved, flared extension of the housing wall, and including a transverse plate portion at the inner end of the flared portion, said plate being provided with a plurality of liquid flow openings, and a plurality of radial vanes disposed in vertical planes between said flow openings, whereby to guide incoming liquid into a substantially vertical flow path, a rotatable shaft extending axially of said housing, protruding beyond the housing, and being adapted to be coupled to motor means, continuously rotatable impeller means fixed to the shaft within the housing for lifting liquid through the housing thereby to circulate the liquid in the reservoir, said impeller means including a pair of impellers fixed to the shaft, the lower one of said impellers being mounted adjacent the inlet of the housing, the upper one of said impellers being mounted adjacent the bottom of the guide means, the impellers being dimensioned for slight clearance with the wall of the housing, and liquid guide means mounted above the impeller means in the housing, the guide means being stationary and provided with a hub to receive the shaft therethrough, the guide means including integral guide vanes extending from the hub for guiding swirling liquid leaving the impeller means along an upward path in the upper portion of the housing, the uppermost portion of the hub being flared as a concave surface of revolution terminating in an annular shoulder substantially coextensive with and spaced above the top of the housing, the shoulder and the top of the housing defining therebetween an annular flow gap through which liquid is forced out laterally of the housing in the form of an annular sheet.

References Cited by the Examiner

UNITED STATES PATENTS

| | | | |
|---|---|---|---|
| 1,933,346 | 10/1933 | Schwentker | 259—97 |
| 2,008,684 | 7/1935 | Craddock | 259—97 |
| 2,038,221 | 4/1936 | Kagi | 259—97 |
| 2,346,366 | 4/1944 | Durdin | 259—97 |
| 2,907,277 | 10/1959 | Lessly | 103—93 |
| 3,106,383 | 10/1963 | Philipps | 259—97 |

CHARLES A. WILLMUTH, *Primary Examiner.*